I. KOECHLIN.
PROCESS AND APPARATUS FOR THE OPTICAL STUDY OF THE MOTION OF MECHANISMS.
APPLICATION FILED MAY 6, 1918.
1,329,909. Patented Feb. 3, 1920.
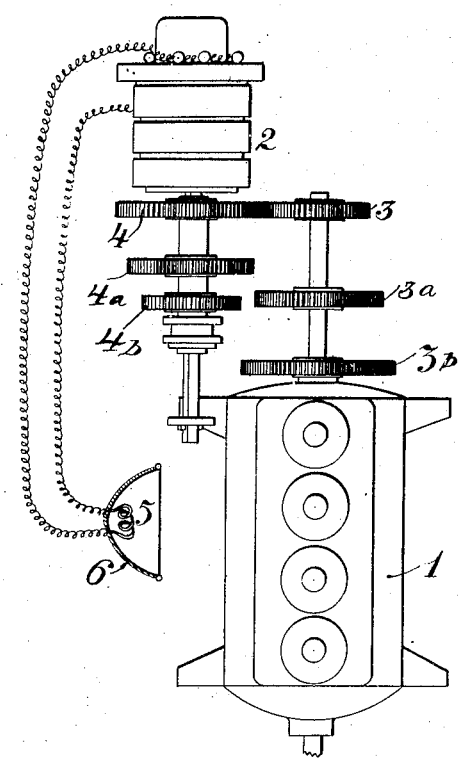
INVENTOR
Isaac Koechlin.
BY
ATTORNEYS.

UNITED STATES PATENT OFFICE.

ISAAC KOECHLIN, OF PARIS, FRANCE.

PROCESS AND APPARATUS FOR THE OPTICAL STUDY OF THE MOTION OF MECHANISMS.

1,329,909.   Specification of Letters Patent.   Patented Feb. 3, 1920.

Application filed May 6, 1918. Serial No. 232,858.

*To all whom it may concern:*

Be it known that I, ISAAC KOECHLIN, a citizen of the Republic of France, manufacturer, residing at Paris, 1 Avenue de Camoens, in the Republic of France, administrator de la Société Anonyme des Automobiles & Cycles Peugeot, have invented certain new and useful Improvements in Processes and Apparatus for the Optical Study of the Motion of Mechanisms, of which the following is a specification.

This invention has for its object to provide an improved apparatus which will allow of studying in a manner analogous to the stroboscopic method, the movements of any mechanism having rotary, oscillatory, or generally any periodic motion whatever.

The improved apparatus comprises an electrical apparatus capable of producing periodically electrical discharges, such as for example, those obtained by means of an ignition magneto for motor car engines, capable of producing two discharges at each revolution. These electrical discharges take place either between the electrodes of a sparking plug, sparking device or between the poles of a silent discharge tube or any other similar device and thus furnish an instantaneous supply of light since the duration of the spark or discharge is practically nil.

Consequently when an object rotates for instance at the same speed as the magneto by whose discharges it is illuminated, it will always be illuminated at the instant when it occupies the same positions in space. In these circumstances the object will then appear to be stationary, and with such an illumination it is possible to perceive any deformations, or variations of positions due to slipping on the driving shaft, and generally the manner in which the mechanism under observation behaves while it is in motion.

For the purpose of studying these successive positions, the illuminating magneto may be simply driven by a speed-reducing or speed-multiplying gear which will allow of varying continuously and automatically the instant when the apparatus in motion is illuminated, so as to obtain a cinematographic image rotating or oscillating as the case may be at any desired speed in such a manner as to allow of readily examining the motion which is thus apparently retarded.

The improved apparatus comprises therefore a device for producing periodic sparks driven by a speed-multiplying or speed-reducing or speed-equalizing gear, the driving wheel of which is connected to one of the rotary parts of the mechanism which it is desired to study, for instance the crank shaft of a motor car engine if it is desired to study the return of the valves upon their seats.

The most convenient construction of the distributer consists of a silent discharge tube coiled upon itself so as to present the smallest possible bulk, located in a projector or reflector.

By varying the ratio of the gear driving the distributer, the motion thereof can be reduced to any desired speed. It is to be understood that the device for generating the current may also be for instance a coil, or an electrostatic machine wherein contacts which are made periodically by the motion of the mechanism to be studied, control the supply of current to the illuminating apparatus.

An embodiment of an apparatus according to this invention is illustrated by way of example in the accompanying drawings.

1 is an engine whose motion it is desired to study. 2 is a magneto driven by the engine by means of a speed change gearing for generating periodic currents.

As shown in the drawing the speed change gearing consists of three gear wheels 3, 3ª, and 3ᵇ on the engine shaft and three gear wheels 4, 4ª and 4ᵇ slidably mounted on the magneto shaft and adapted to respectively and successively meet with the gear wheels of the engine shaft. These currents feed a silent discharge tube 5 located at the focus of a reflector 6 in such a manner as to illuminate periodically the engine or certain parts of the engine.

Any suitable means may be employed for producing at will a variable angular position of the magneto relatively to the engine.

Having now particularly described and ascertained the nature of my said invention, and in what manner the same is to be performed, I declare that what I claim is:

1. A process for the optical study of the motion of mechanisms, which consists in illuminating the mechanism to be studied by means of a source of electric illumination that produces instantaneous flashes at intervals of time depending on the duration of the cycles of motion of the mechanism to be studied.

2. An apparatus for the optical study of the motion of mechanisms, comprising the combination of a silent discharge tube, an apparatus for generating intermittent currents adapted to produce instantaneous discharges in the said tube, and driving means for driving the said apparatus in correlation with the movements of the mechanism to be studied, the said silent discharge tube being adapted to illuminate the said mechanism to be studied.

3. An apparatus for the optical study of the motion of mechanisms, comprising in combination a silent discharge tube adapted to illuminate the said mechanism, a magneto adapted to produce instantaneous discharge into the said tube, and driving means for driving said magneto in correlation with the movements of the said mechanism to be studied.

4. An apparatus for the optical study of the motion of mechanisms, comprising in combination an apparatus for generating intermittent currents, an illuminating apparatus for producing instantaneous flashes by the action of the currents discharged by the said generating apparatus, and driving means for driving the said current-generating apparatus in correlation with the cycles of motion of the mechanism to be studied, said mechanism comprising a means for changing the ratio of the transmission of motion for the purpose of varying the instant of illumination in successive cycles of the motion.

In testimony, that I claim the foregoing as my invention I have signed my name in presence of two subscribing witnesses.

ISAAC KOECHLIN.

Witnesses:
    CHAS. P. PRESSLY,
    EUGENE WATTIER.